United States Patent [19]

Chapman et al.

[11] Patent Number: 5,718,230
[45] Date of Patent: Feb. 17, 1998

[54] METHOD AND APPARATUS FOR CREATING ULTRASOUND IMAGES USING A REDUCED NUMBER OF TRANSMIT BEAM LINES

[75] Inventors: Christopher S. Chapman, Redmond; Ricardo Ahumada, Issaquah; John C. Lazenby, Fall City; Lin-Xin Yao, Bellevue, all of Wash.

[73] Assignee: Siemens Medical Systems, Inc., Iselin, N.J.

[21] Appl. No.: 721,300

[22] Filed: Sep. 26, 1996

[51] Int. Cl.⁶ ............................................. A61B 8/00
[52] U.S. Cl. ...................................... 128/661.01
[58] Field of Search ..................... 128/660.07, 661.01; 73/625, 626

[56] References Cited

U.S. PATENT DOCUMENTS

| | | | |
|---|---|---|---|
| 4,785,818 | 11/1988 | Hardin | 128/660.07 |
| 4,886,069 | 12/1989 | O'Donnell | 128/661.01 |
| 5,462,057 | 10/1995 | Hunt et al. | 128/661.01 |
| 5,544,655 | 8/1996 | Daigle | 128/661.01 |

Primary Examiner—George Manuel

[57] ABSTRACT

An ultrasound system creates ultrasound images at faster frame rate by eliminating ultrasonic transmissions along every beam line. Preferably, ultrasound images are created by alternately transmitting ultrasonic signals on the even and odd transmit beam lines. Parallel beam forming is used where transmissions along a single transmit beam line create echo signals on a pair of receive beam lines. To eliminate the artifact caused by the round-trip beam line sensitivities, echo signals created in response to transmissions along the even transmit beam lines are averaged with echo signals created in response to transmissions on the odd transmit beam lines. The averaged echo signals are used to create an ultrasound image without artifacts.

26 Claims, 5 Drawing Sheets

METHOD AND APPARATUS FOR CREATING ULTRASOUND IMAGES USING A REDUCED NUMBER OF TRANSMIT BEAM LINES

FIELD OF THE INVENTION

The present invention relates to ultrasound systems in general, and in particular to methods of increasing the frame rate at which ultrasound images are produced without creating artifacts.

BACKGROUND OF THE INVENTION

Ultrasound is an increasingly common tool for viewing the internal body matter such as organs or tissue of a patient in real time. In an ultrasound system, acoustic signals having frequencies in the range of 2–20 MHz are transmitted from a transducer into the patient. A portion of the acoustic signals are reflected by the body matter to create echoes that are received and interpreted to produce an image of the patient's body.

A typical ultrasound image is created by focusing ultrasonic energy along a series of beam transmit lines. Echoes produced in response to the transmissions along each beam line are received along a corresponding receive beam line by the transducer and converted into electrical signals representative of the strength of the echo. Echoes received as a result of transmissions on each beam line are analyzed and converted into data that is used to modify the intensity or color of a column of pixels on a display monitor. Most ultrasound systems create images using between 50 and 500 transmit beam lines, each of which must be retransmitted in order to produce a new ultrasound image.

The rate at which new ultrasound images are produced is referred to as the frame rate of the ultrasound system. In general, the largest component of the frame rate is the time required to transmit and receive the ultrasonic signals along each of the beam lines. To increase the frame rate, some ultrasound systems create ultrasound images by transmitting ultrasonic signals on less than all of the beam lines. One example of this technique is referred to as parallel beam forming, whereby transmissions along one transmit beam line produces echoes along two receive beam lines. However, for reasons that will be discussed below, ultrasound images created using parallel beam forming produce artifacts in the image that may appear unnatural to a trained physician or sonographer. Therefore, there is a need for an ultrasound system that can produce ultrasound images at an increased frame rate without introducing artifacts.

SUMMARY OF THE INVENTION

The present invention is a method for increasing the rate at which an ultrasound system can produce ultrasound images by eliminating the need to transmit ultrasonic signals along each beam line. By alternately transmitting on a set of even and odd transmit beam lines, the time required to produce the echo signals that are used to create the ultrasound image is decreased by a factor of two.

According to an alternative embodiment of the invention, the present invention produces ultrasound images using a modified form of parallel beam forming. The transmission of ultrasonic signals on a single transmit beam line produces echo signals on a pair of receive beam lines. The ultrasound system alternately transmits on a set of even and odd transmit beam lines. By averaging the echo signals received in response to the transmissions on both the even and odd beam lines, any artifacts created as a result of the transmission on either set alone are eliminated.

To average the echo signals created in response to transmissions on the even and odd transmit beam lines, an averaging circuit includes a memory that stores the echo signals created in response to transmissions on the even or odd beam lines. Echo signals created in response to a subsequent transmission of the odd or even transmit beam lines are applied to a summing block where the echo signals are summed with the previously stored echo signals. The output of the summing block feeds a division circuit that divides the sum by two. The averaged echo signals are fed to a scan converter to produce the ultrasound image. The averaging circuit can also be positioned after the scan converter to average pixel data created by the scan converter due to transmissions on the even or odd beam lines.

An alternative embodiment of the averaging circuit averages the echo signals created in response to transmissions along the set of even or odd transmit beam lines with the echo signals used to create a previous ultrasound image. The new echo signals are multiplied by a factor K while the echo signals used to create the previous image are multiplied by a factor 1−K. After multiplying the two sets of echo signals, the result is added to produce averaged echo signals used to create a new ultrasound image. The newly averaged echo signals are stored in a memory to be used when creating the next ultrasound image.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is an ultrasound system that produces ultrasound images at an increased frame rate by transmitting ultrasonic signals on less than all of the available transmit beam lines.

Figure 1:
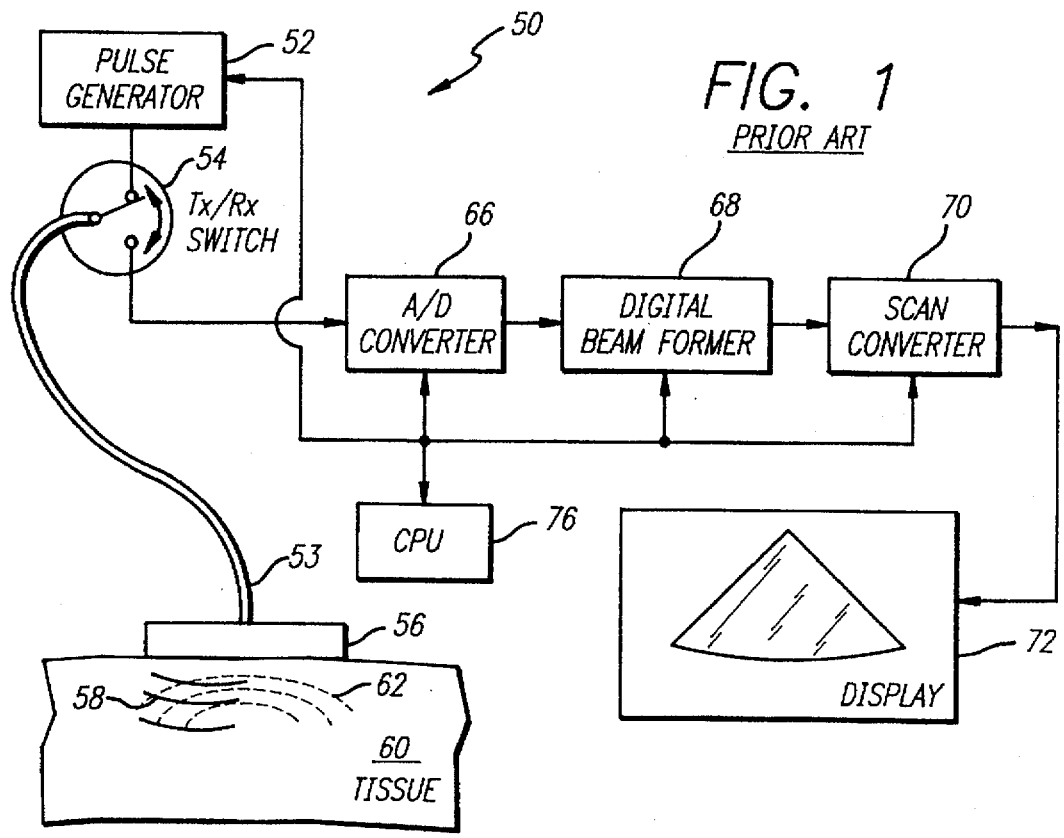
FIG. 1 is a simplified block diagram of an ultrasound system in which the present invention is implemented.

FIG. 1 is a simplified block diagram of an ultrasound system according to the present invention. The ultrasound system 50 includes a pulse generator 52 that generates a series of electronic signals that are optimized to produce echoes that can be detected and convened into an ultrasound image. The output of the pulse generator 52 is fed to a transmit/receive switch 54 that has two positions. In the first position, the output of the pulse generator is coupled to an ultrasound transducer 56. In the second position, the transmit/receive switch 54 couples electronic echo signals produced by the transducer in response to a received echo to an analog-to-digital converter 66.

The ultrasonic transducer 56 comprises an array of transducer elements, each of which is preferably a piece of piezoelectric material that converts the electronic pulses produced by the pulse generator into an ultrasonic sound wave that is directed into the patient's body tissue 60. A portion of the ultrasonic sound wave is reflected by the internal body matter of the patient to create echoes that are received by the transducer 56. Upon receiving an ultrasonic echo, each transducer element generates an electronic echo signal that is analyzed by the ultrasound system to produce an ultrasound image.

As indicated above, when the transmit/receive switch 54 is in the second position, the echo signals produced by the transducer elements in response to a received echo are coupled to the analog-to-digital converter 66. The analog-to-digital converter samples the echo signals created to create a digitized version of the signals. The output of the analog-to-digital converter 66 is fed to a digital beam former 68 that combines the selected samples of the echo signals produced by the transducer elements to create a single binary number that is representative of the echo intensity at any given position in the body tissue. The output of the digital beam former is fed to a scan converter 70 that converts the data into an array of pixel intensities which are used to produce a digital ultrasound image that is displayed on a display screen 72.

As an alternative to the arrangement shown in FIG. 1, the beam former may be an analog device that is coupled to the transducer elements. The output of the beam former is then digitized with an analog-to-digital converter that feeds the scan converter 70.

Controlling the operation of the ultrasound system 50 is a central processing unit 76 having its own internal and external memory in which data and the operating instructions of the CPU are stored. In addition, the CPU may be coupled to a mass storage device such as a hard drive, a communication circuit for transmitting and receiving data from a remote location, and a video tape recorder for recording the ultrasound images produced.

Figure 2:
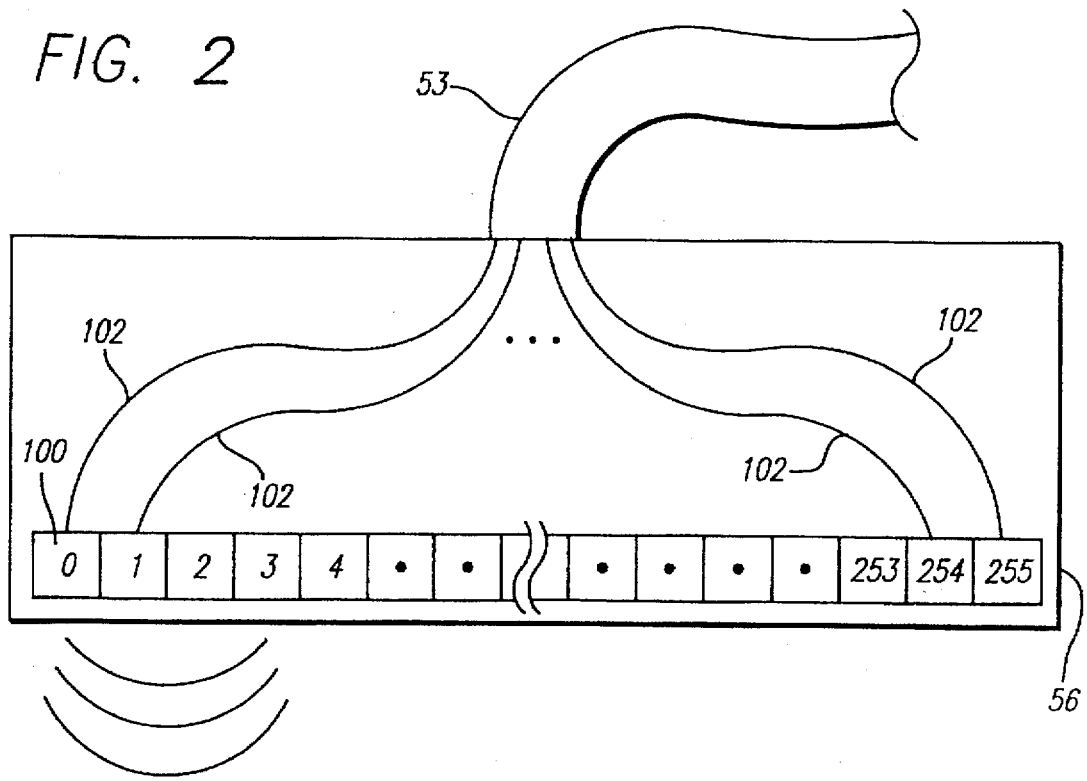
FIG. 2 illustrates how a plurality of transmit and receive beam lines are used to create an ultrasound image.

FIG. 2 shows in greater detail the ultrasound transducer 56 that is used to transmit and receive signals from a patient's body tissue. The transducer 56 comprises a number of piezoelectric elements 100 that are each connected by a separate lead 102 to either the pulse generator or the analog-to-digital converter. The pulse generator produces a beam of ultrasonic energy by controlling the timing and/or the power of the driving signals that are applied to each of the transducer elements. The beam is focused along one of a series of beam lines $TX_0$, $TX_1$, $TX_2$, etc. that extend in relatively straight lines away from the front face of the transducer. Echoes created as a result of the transmissions along the transmit beam lines are received along receive beam lines $RX_0$, $RX_1$, $RX_2$, etc. that are generally positioned over the transmit beam lines. Echoes received on each receive beam line are used by the scan converter to produce the ultrasound image.

As indicated above, there may be as many as 128 or 256 piezoelectric elements in a typical ultrasound transducer. Not all of the transducer elements need to be activated to transmit a beam along a particular beam line. As was also indicated above, the majority of the time required to create an ultrasound image is spent transmitting and receiving the ultrasonic signals along each of the beam lines. The present invention increases the frame rate by eliminating the need to transmit ultrasonic signals on each of the beam lines.

As will be described in further detail below, a first embodiment of the present invention creates an ultrasound image by only transmitting ultrasonic signals on every other beam line. For example, FIG. 2 shows 128 transmit beam lines $TX_0$, $TX_1$, $TX_2$ ... $TX_{127}$. It is possible to produce an ultrasound image at an increased frame rate by transmitting ultrasonic signals into the patient on every other beam line. For example, an image can be created by transmitting on the even beam lines $TX_0$, $TX_2$, $TX_4$, etc. Echo signals, created in response to these transmitted signals, are used by the scan converter to produce the ultrasound image. Because only half of the available transmit beam lines are used, the frame rate of the ultrasound system is doubled.

Figure 3:
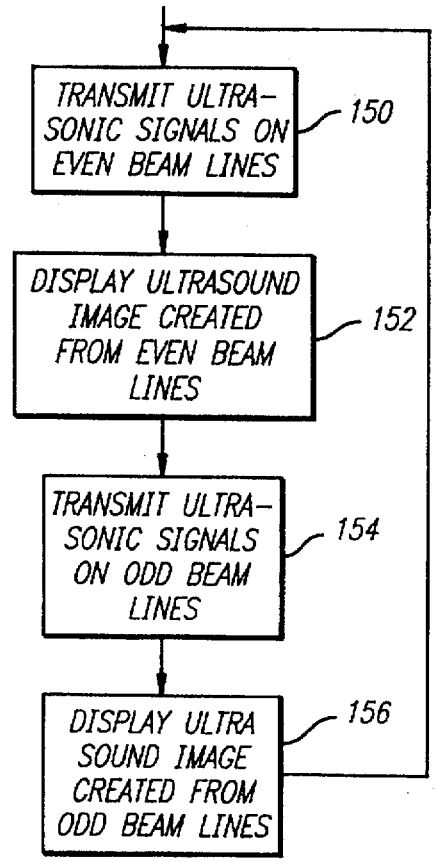
FIG. 3 is a flow chart showing the steps of a method of creating an ultrasound image according to a first aspect of the invention.

FIG. 3 is a flow chart illustrating the steps performed by a first embodiment of the present invention to produce ultrasound images at a higher frame rate. Beginning at a step 150, the ultrasound system begins sequentially transmitting ultrasonic signals on each of the even beam lines. Echoes received by the ultrasound transducer in response to the even beam line transmissions are collected, digitized and supplied to the beam former and scan converter where the echo signals are converted into an ultrasound image at step 152. Because the number and orientation of the beam lines does not usually correspond to the number and orientation of the pixel columns in the display, the scan converter will interpolate the echo signal data in order to compute an intensity value for each pixel in the display.

In order to capture as much detail of the tissue being examined as possible, the ultrasound system produces the next ultrasound image frame by transmitting ultrasonic signals along all of the odd beam lines at step 154. At step 156, the echo signals received by the transducer in response to the odd beam line transmissions are digitized and supplied to the beam former and scan converter where the data is converted into an other ultrasound image that is displayed on the monitor. Processing then returns to step 150, wherein the next ultrasound image is produced using the even transmit beam lines and the process repeats. The method shown in FIG. 3 can be thought of as operating in a "low resolution mode" whereby only half the available beam lines are used at any given time to produce an ultrasound image.

Figure 4:
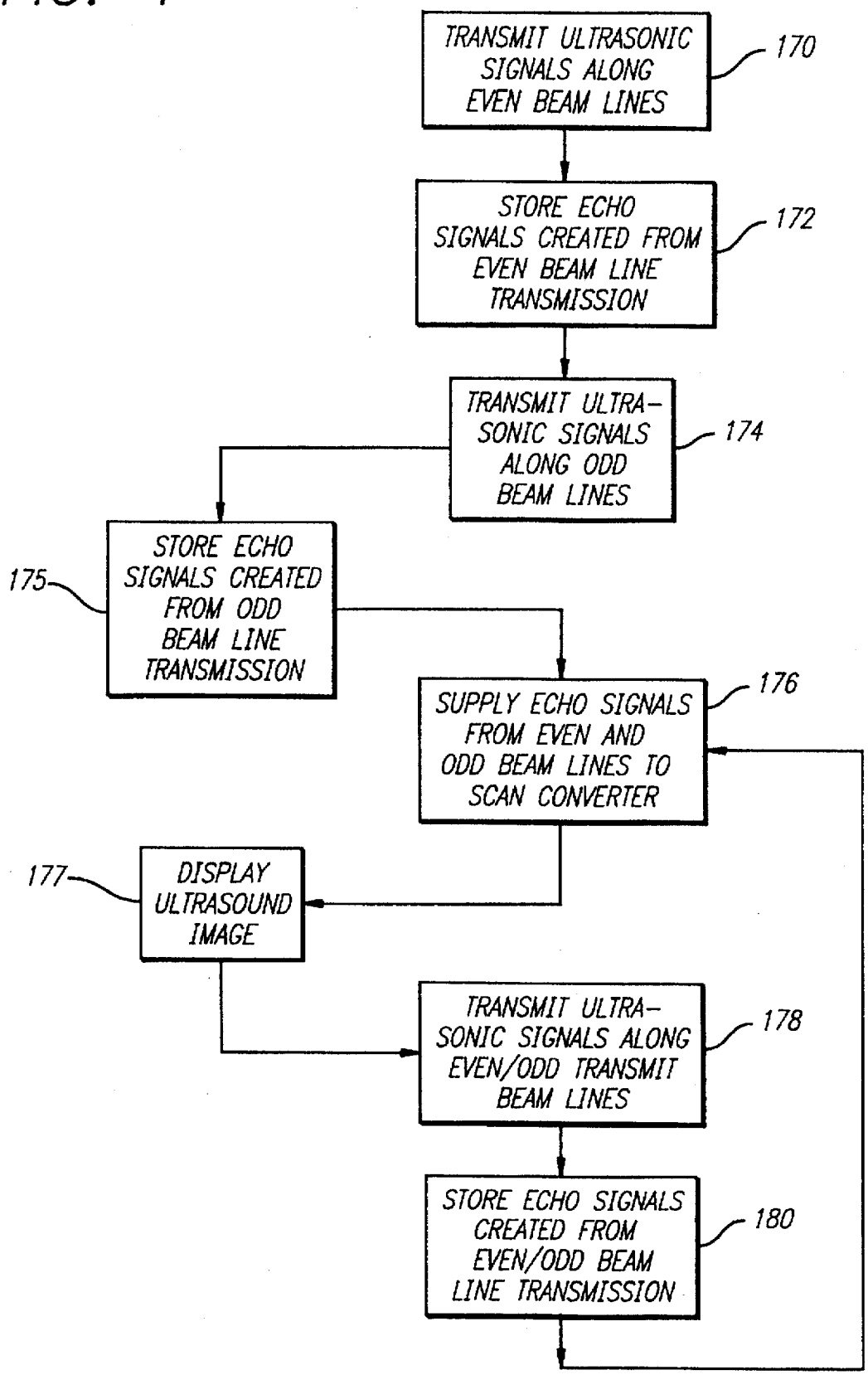
FIG. 4 is a flow chart showing the steps of a method of creating an ultrasound image according to a second aspect of the present invention.

FIG. 4 is a flow chart that illustrates an alternative method of creating an ultrasound image by using a reduced number of transmit beam lines. Beginning at a step 170, the ultrasound system begins sequentially transmitting ultrasonic signals along the even transmit beam lines. Echo signals created in response to these transmissions are digitized and stored in a memory within the ultrasound system at a step 172.

At step 174, the ultrasound system begins sequentially transmitting ultrasonic signals along the odd transmit beam lines. The echo signals received as a result of the odd beam line transmissions are digitized and stored in a memory at a step 175. At a step 176, the stored echo signals received as a result of the even and odd beam line transmissions are supplied to the scan converter which produces an ultrasound image. The display is then shown to the physician or sonographer at a step 177.

At step 178, the ultrasound system begins to produce the next image by sequentially transmitting ultrasonic signals on either the even transmit beam lines or the odd transmit beam lines in an alternating fashion. At a step 180, the echo signals created as a result of the even/odd beam line transmission are stored in memory by overwriting the echo signals stored from the previous even/odd beam line transmission. Processing then returns to step 176 whereby the data from the previous even beam line transmission and the previous odd beam line transmission is supplied to the scan converter to produce the next ultrasound image.

In order to create a flicker free image, the ultrasound display may need some amount of persistence. In that case, the new data used to create an image is averaged with the data used for the previous image, according to techniques known to those of ordinary skill in the art. Because the present invention creates images by reducing the number of beam lines used by a factor of two, the frame rate of an ultrasound system is effectively doubled.

Figure 5:
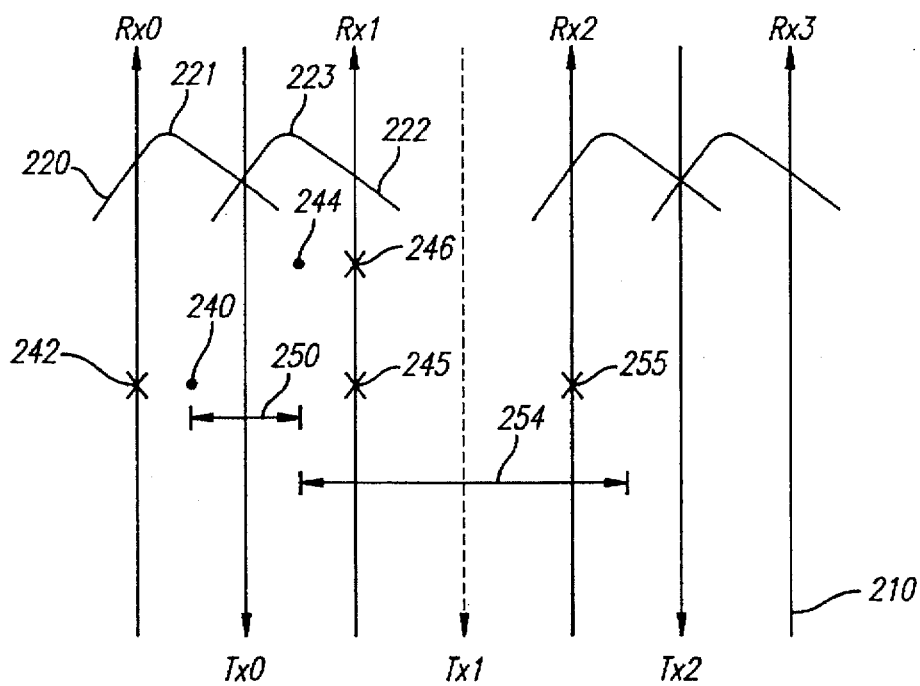
FIG. 5 illustrates how conventional parallel beam forming can create artifacts in an ultrasound image.

One known method of reducing the number of transmit beam lines that must be used to create an ultrasound image is a technique known as parallel beam forming. In parallel beam forming, a single transmit beam is used to produce echo signals along a pair of receive beam lines. For example, as shown in FIG. 5, a transmit beam line $TX_0$ is positioned between two receive beam lines $RX_0$ and $RX_1$. Similarly, the transmit beam line $TX_2$ is positioned midway between two receive beam $RX_2$ and $RX_3$. By transmitting ultrasonic signals along the two transmit beam lines $TX_0$ and $TX_2$, echo signals are received on four receive beam lines $RX_0$, $RX_1$, $RX_2$ and $RX_3$. Echo signals on each receive beam line are supplied to the scan converter which produces pixel data that is displayed on the image monitor.

The problem that occurs when using a traditional method of parallel beam forming is that the point of maximum round-trip beam sensitivity is not centered over the receive beam. This produces some distortion or artifact that can be seen by a physician or sonographer. For example, the round-trip sensitivity of receive beam $RX_0$ is plotted as a curve 220 having a peak at a point 221 that is located between the receive beam $RX_0$ and the transmit beam $TX_0$. With this sensitivity pattern, a target element 240 that is located in the tissue at a point midway between the transmit beam $TX_0$ and the receive beam $RX_0$ (i.e., at the point of maximum round-trip beam sensitivity) will appear in the ultrasound image as if it were located at a point 242 that is positioned directly on the receive beam line $RX_0$. Similarly, the receive beam line $RX_1$ has a round-trip sensitivity as shown by a curve 222 that has a peak 223 located at a point between transmit beam $TX_0$ and the receive beam $RX_1$. This offset in the receive beam line round-trip sensitivity causes a target element 244 whose actual position in the tissue is midway between the transmit beam $TX_0$ and the receive beam $RX_1$ to appear in the ultrasound image as if it were located at a point 246 that is positioned directly on the receive beam $RX_1$.

In addition to changing the apparent position of target elements in the tissue being examined, the distortion created by the round-trip receive beam sensitivities causes the display to change in a non-linear fashion as the transducer is moved. For example, if the transducer that creates the transmit beam lines shown in FIG. 5 is moved along the length of a line 250, so that the target element 240 is positioned under the point of maximum round-trip sensitivity of the receive beam $RX_1$, the target element will appear in the ultrasound image to have jumped from the position 242 that is located on the receive beam $RX_0$ to a position 245 that is located on the receive beam $RX_1$. The distance between the points 242 and 245 is greater than the distance moved by the transducer (i.e., the length of the line 250) thereby causing the image displayed to seem disproportional with the distance moved by the transducer.

If the transducer is further moved along the length of a line 254 so that a target element located at the point of maximum round-trip sensitivity of receive beam $RX_1$ is moved to a location that is under a point of maximum round-trip sensitivity of receive beam $RX_2$, the target element will appear to have only moved from a point 245 located on the receive beam line $RX_1$ to point 255 located on the receive beam line $RX_2$. In this case, movement of the transducer causes the target element to appear as if it was moved a shorter distance on the ultrasound image. Thus, the traditional method of parallel beam forming tends to produce ultrasound images that distort the position of target elements in the tissue as well as appear jerky as the transducer is moved.

Figure 6:
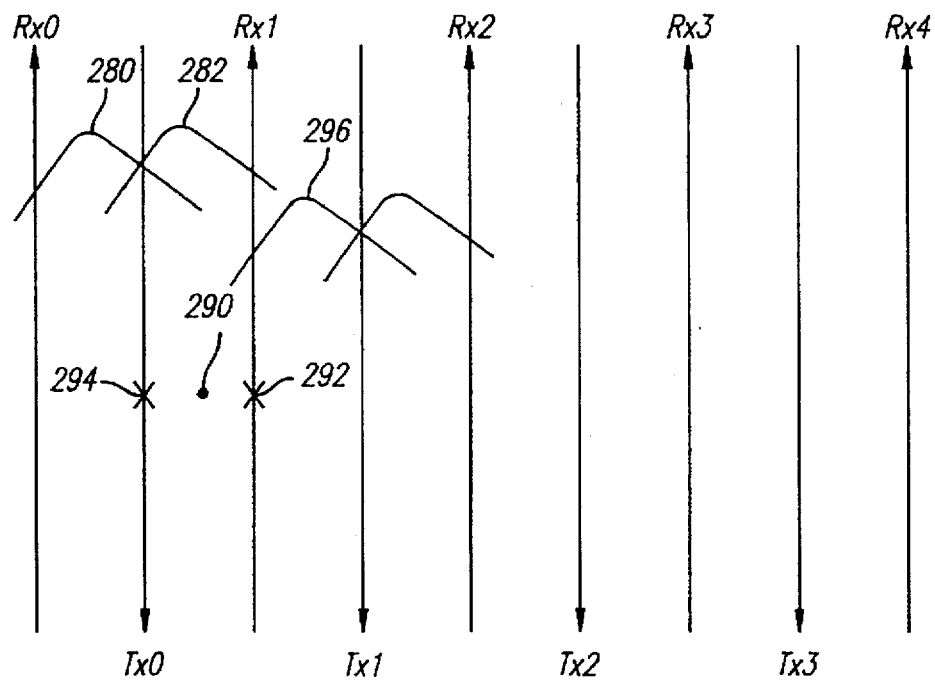
FIG. 6 illustrates a method of performing parallel forming that eliminates the artifacts shown in FIG. 5 according to a third aspect of the present invention.

To solve the problems associated with the parallel beam forming shown in FIG. 5, the ultrasound system of the present invention performs parallel beam forming in a manner that cancels the artifacts created by the round-trip sensitivities of the receive beam lines not being positioned over the center of the receive beam lines. For example, as shown in FIG. 6, when ultrasonic signals are transmitted on the transmit beam line $TX_0$, the maximum round-trip sensitivity of a receive beam line $RX_0$ is located at a point 280 that is positioned between the receive beam line $RX_0$ and the transmit beam line $TX_0$. Similarly, the point of maximum round-trip sensitivity of receive beam line $RX_1$ is located at a point 282 that is positioned between the location of transmit beam line $TX_0$ and receive beam line $RX_1$. However, when ultrasonic sound waves are transmitted along a transmit beam line $TX_1$, the point of maximum round-trip sensitivity of the receive beam line $RX_1$ moves to a point 296 that is located midway between the receive beam line $RX_1$ and the transmit beam line $TX_1$.

To eliminate the distortion caused by the receive beam line sensitivities, the present invention averages the echo signals obtained using the even transmit beam lines with the echo signals obtained using the odd transmit beam lines. By averaging the two sets of echo signals together, the artifact created by the round-trip receive beam sensitivity position is eliminated.

To illustrate how the averaging works to eliminate the artifacts caused by the round-trip receive beam line sensitivity, consider a target element 290 that is positioned between the transmit beam line $TX_0$ and the receive beam line $RX_1$. When the transmit beam $TX_0$ is fired in a parallel beam forming mode, the position of the maximum round-trip sensitivity of the receive beam line $RX_1$ is located at the point 282 which is between the receive beam $RX_1$ and the transmit beam $TX_0$. If an image were displayed from the echo signals created in response to the transmission of ultrasonic signals along the transmit beam line $TX_0$, then the target element 290 located between $TX_0$ and $RX_1$ would appear as if the target were to be shifted right to a position 292 that is on the receive beam line $RX_1$. Similarly, if an ultrasound image were created from the echo signal created in response to the transmission of ultrasonic signals along the transmit beam line $TX_1$, then the target element would appear as if it were located to the left of its actual position at a point 294. By averaging the echo signals created in response to transmissions along the even transmit beam line $TX_0$, and the odd transmit beam line $TX_1$, the rightward shift of the target element cancels the leftward shift. By creating an ultrasound image using the average of both sets of echo signals, the target element 290 appears in the ultrasound image at a location corresponding to its actual location in the body.

Figure 7:
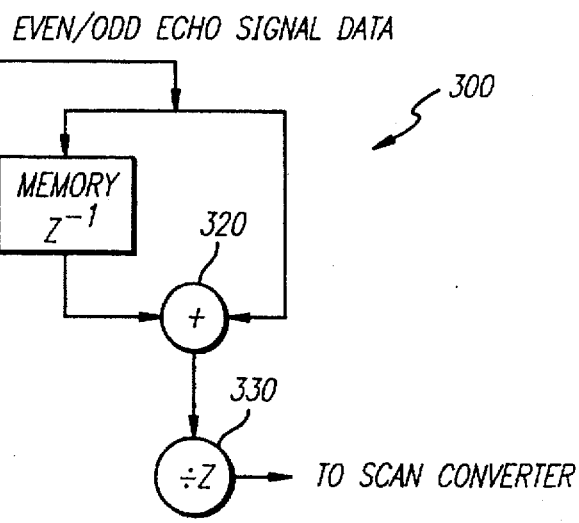
FIG. 7 is a block diagram of an averaging circuit for performing parallel beam forming according to another aspect of the invention.

FIG. 7 shows a functional block diagram of an averaging circuit that operates to average the echo signals created by alternately transmitting ultrasonic signals along the even and odd transmit beam lines. The averaging circuit includes a memory 310, a summing circuit 320 and dividing circuit 330. The summing circuit has a first input that receives the echo signals created in response to the alternating transmissions along the even and odd transmit beam lines. Another input of the summing circuit receives echo signals previously stored in the memory 310. In operation the most recent echo signals created in response to transmissions on the even or odd transmit beam lines are summed with the echo signals previously created in response to transmissions on the odd or even transmit beam lines. After summing the signals from the even transmit beam lines with the signals from the previous odd transmit beam lines (or vice versa) the new echo signals overwrite the data stored in the memory 310. The output of the summing circuit 310 feeds an input of the dividing circuit 330 that divides the sum by two. The output of the dividing circuit feeds the scan converter that creates pixel data from the averaged echo signal data to produce an ultrasound display.

When the averaging circuit 300 shown in FIG. 7 is first started, the echo signals created in response to transmissions along either the even or odd transmit beam lines are stored in the memory 310 before the first image can be produced. However, for the next and subsequent images, the echo signals created in response to the transmission on the even or odd beam lines is averaged with the echo signals previously stored from the transmissions.

It should be noted that the averaging circuit 300 shown in FIG. 7 could be positioned after the scan converter. In that case, averaging circuit receives as its input the pixel data created by the scan converter in response to transmissions in the even or odd transmit beam lines. The pixel data is fed to the summing circuit 320 where the new pixel data is summed with the previously stored pixel data. The output of the dividing circuit is therefore the averaged pixel data that feeds the display directly.

Although the circuitry shown in FIG. 7 is shown as discrete elements, it will be appreciated that the functions described may be implemented by a suitably programmed microprocessor or digital signal processor.

The averaging circuit 300 shown in FIG. 7 is optimal at sufficiently high frame rates (for example frame rates greater than 20 Hz). However at lower frame rates this circuit may smear the image too much, and therefore an averaging circuit of the type shown in FIGS. 8A or 8B must be used.

Figure 8A:
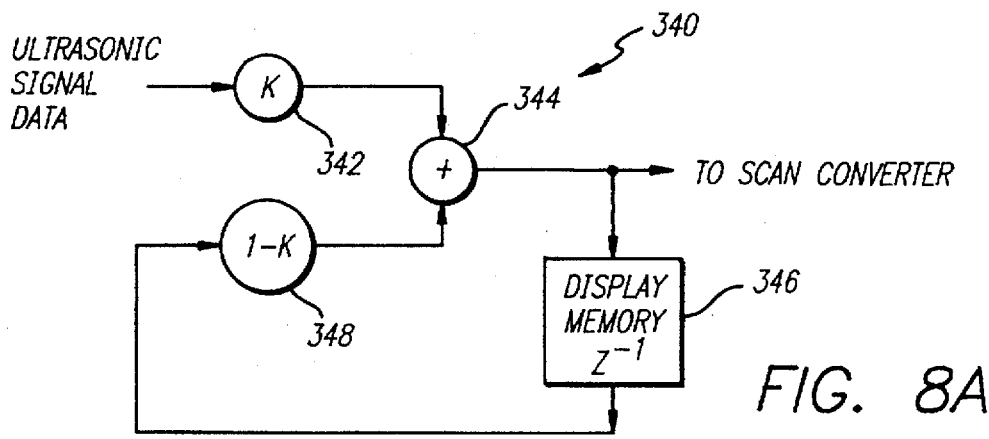
FIG. 8A is a block diagram of an alternative embodiment of an averaging circuit for performing parallel beam forming according to the present invention.

FIG. 8A illustrates an averaging circuit for producing an ultrasound image using the echo signals created in response to transmissions on either the even or odd transmit beam lines and the echo signals used to create a previous ultrasound image. The averaging circuit 340 receives the echo signals created as a result of alternately transmitting ultrasonic signals along the even and odd transmit beam lines. The incoming echo signals are multiplied by a factor, K, in a multiplier circuit 342. The output of the multiplier circuit 342 feeds a summing circuit 344. A display memory 346 stores the echo signals used to create a previous ultrasound image. The stored echo signals are read from the memory 346 and scaled by a factor, 1–K, in a multiplier circuit 348. The output of the multiplier circuit 348 is coupled to a second input of the summing circuit 344. The output of the summing circuit 344 is routed to the scan converter that creates the pixel data to produce the next ultrasound image. In addition, the output of the summing circuit 344 overwrites the echo signals previously stored in the memory 346.

As will be appreciated, the averaging circuit weights the data to be displayed heavily in favor of the previously displayed data for small values of K. K is a user defined parameter that is selectable between 0 and 1 with the most common values being in the range of 0.2–0.6.

If the memory circuit 346 is initially empty, the display will slowly rise to the average of the echo signals created in response to transmissions along the alternating even and odd transmit beam lines. The rate at which the image reaches the average is directly proportional to the value of K. At small values of K the image exhibits a relatively large persistence or reluctance to change. However, if the value of K is too large, the image will appear to jitter.

In order to speed the time at which the ultrasound image will display the average of the even and odd transmit beam lines, it is possible to "preload" the memory circuit 346 with the first set of ultrasonic signals created in response to the ultrasonic signals transmitted along either the even or odd transmit beam lines before starting the operation of the averaging circuit 340.

Figure 8B:
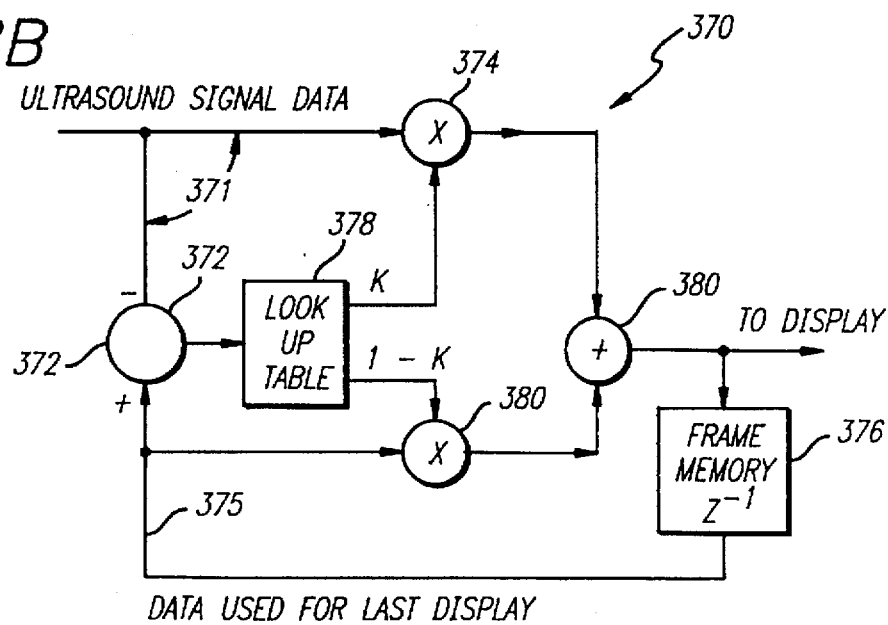
FIG. 8B is a block diagram of another alternative embodiment of an averaging circuit for performing parallel beam forming according to the present invention.

FIG. 8B shows yet another alternative embodiment of an averaging circuit that operates to remove the artifacts created by the round-trip beam line sensitivities. The averaging circuit 370 receives the echo signals created in response to the alternating transmissions on the even/odd transmit beam lines. The incoming echo signals are applied to a first input to a differencing circuit 372 as well as a first input multiplying circuit 374. Coupled to another input of the differencing circuit 372 are echo signals that are read from a display memory circuit 376. The differencing circuit 372 subtracts the value of the new echo signals from the value of the echo signals stored in the memory 376. The difference of the echo signal is used as an index into a look-up table 378 that provides two constants K and 1–K. The constant K is fed into a second input of the multiplier circuit 374 in order to produce an output equal to the product of the new echo signals and the constant K. A second multiplier circuit 380 multiplies the ultrasonic signal data read from the display memory 376 and the value 1–K as determined from the look-up table 378. The outputs of the two multiplier circuits 380 and 374 are summed in a summing circuit 382. The output of the summing circuit 382 is fed to the scan converter to produce the pixel data in order to display the next ultrasound image. The averaged echo signals produced at the output of the summing circuit 382 also overwrites the previously stored echo signals in the display memory circuit 376 in order to be used in averaging the next set of ultrasonic signals created in response to the alternating even or odd transmit beam line transmissions.

The values K and K-1 stored in the lookup table are chosen so that K is smaller for smaller difference between the incoming echo signal and the stored echo signals, the value of K is larger for larger values of the difference. In this way, large changes in the echo signals which result from large movements of the transducer pass through the filter relatively unchanged. However, small changes in the echo signal due to small motions have a relatively large amount of filtering applied. For example, choosing K=0.4 for echo signal differences less than 6 dB with K smoothly rising towards 1.0 for larger differences looks good to most people at moderate frame rates. The exact coefficients are not critical to the operation of the present invention and may be easily optimized by one skilled in the art for different user preferences and frame rates.

Again, it will be appreciated that the averaging circuits 340 and 370 described above can be positioned after the scan converter. In this case, the averaging circuits receive the pixel data created by the scan converter in response to echo signals from transmissions on the even or odd transmit beam lines and average it with the pixel data created in response to the previous transmissions on the odd or even transmit beam lines. The averaged pixel data produced at the outputs of the summing circuits 344 and 380 feeds the display to produce the next ultrasound image.

Although the present invention has been described with respect to B mode (tissue) imaging, it would be appreciated by one skilled in the art that the invention works equally as well in color flow or power (amplitude) mode. In these modes, a plurality of transmits occur along each transmit beam line. However, it is still possible in these modes to alternate between two different sets of transmit beam lines. The data resulting from each set of transmit beam lines is then combined as described above.

As can be seen from the above, the present invention is a method for increasing the frame rate at which an ultrasound image can be created by limiting the number of transmit beam lines that must be used to create the echo signals. Parallel beam forming is used where one transmit beam line creates echo signals on two receive beam lines. By alternately using the even and odd transmit beam lines to create echo signals on the receive beam lines and by averaging the ultrasonic signals obtained from each beam line, any artifacts created as a result of the receive beam line sensitivities are eliminated.

The embodiments of the invention in which an exclusive property or privilege is claimed are defined as follow:

1. A method for creating an ultrasound image in an ultrasound system that transmits and receives ultrasonic signals on a plurality of beam lines, comprising:
    transmitting ultrasonic signals along a first set of transmit beam lines;
    receiving echo signals created in response to the transmission along the first set of transmit beam lines;
    applying the received echo signals created in response to the transmission along the first set of transmit beam lines to a scan converter to produce a set of pixel data;
    displaying the set of pixel data on a monitor to produce the ultrasound image;
    creating a subsequent ultrasound image by transmitting ultrasonic signals along a second set of transmit beams lines that differ from the first set of transmit beam lines;
    applying the received echo signals created in response to the transmission along the second set of beam lines to the scan converter to produce another set of pixel data; and
    displaying the other set of pixel data to produce the subsequent ultrasound image on the monitor, wherein the transmissions of ultrasonic signals on the first and second set of transmit beams lines are performed alternately.

2. The method of claim 1, further comprising:
    storing the echo signals received in response to the transmissions on the first and second set of beam lines;
    applying the echo signals created in response to the transmission on the first set of transmit beam lines and a stored set of echo signals created in response to a previous transmission on the second set of beam lines to the scan converter to produce the pixel data; or
    applying the echo signals created in response to the transmission along the second set of transmit beam lines and a stored set of echo signals created in response to a previous transmission on the first set of transmit beam lines to the scan converter to produce the pixel data.

3. The method of claim 1, wherein the first set of transmit beam lines comprises a set of even transmit beam lines and the second set of beam lines comprises a set of odd transmit beam lines.

4. The method of claim 1, wherein the ultrasound system operates in a parallel beam forming mode whereby the transmission of ultrasonic signals along a single transmit beam line produces echo signals on a pair of receive beam lines; the method further comprising:
    averaging the echo signals created in response to transmissions along the first and second set of transmit beam lines; and
    applying the averaged echo signals to the scan converter to produce the pixel data for the ultrasound image.

5. The method of claim 1, wherein the ultrasound system operates in a parallel beam forming mode whereby the transmission of ultrasonic signals along a single transmit beam line produces echo signals on a pair of receive beam lines, the method further comprising:
    storing the echo signals that are used by the scan converter to produce a previous ultrasound image;
    averaging the echo signals created in response to the transmissions along the first or second set of transmit beam lines with the stored echo signals used to produce the previous ultrasound image; and
    applying the averaged echo signals to the scan converter to produce the pixel data for a new ultrasound image.

6. The method of claim 5, wherein the step of averaging the echo signals created in response to the transmissions along the first or second set of transmit beam lines with the stored echo signals comprises:
    scaling the echo signals created in response to transmissions along the first or second set of transmit beam lines by a factor (K);
    scaling the stored echo signals by a factor (1–K); and
    summing the scaled echo signals and applying the sum to the scan converter to produce the pixel data for a new ultrasound image.

7. The method of claim 1, wherein the ultrasound system operates in a parallel beam forming mode whereby the transmission of ultrasonic signals along a single transmit beam line produces echo signals on a pair of receive beam lines, the method further comprising:
    averaging the pixel data created by the scan converter in response to echo signals created by transmissions along the first and second set of transmit beam lines; and
    displaying the averaged pixel data to create the ultrasound image.

8. The method of claim 1, wherein the ultrasound system operates in a parallel beam forming mode whereby the transmission of ultrasonic signals along a single transmit beam line produces echo signals on a pair of receive beam lines, the method further comprising:
    storing the pixel data created by the scan converter to produce a previous ultrasound image;

averaging the pixel data created by the scan converter in response to the transmissions along the first or second set of transmit beam lines with the stored pixel data used to produce the previous ultrasound image; and displaying the averaged pixel data to produce a new ultrasound image.

9. The method of claim 8, wherein the step of averaging the pixel data created in response to the transmissions along the first or second set of transmit beam lines with the stored pixel data comprises:

scaling the pixel data created by the scan converter in response to transmissions along the first or second set of transmit beam lines by a factor (K);

scaling the stored pixel data by a factor (1–K); and summing the scaled pixel data and displaying the summed pixel data to produce a new ultrasound image.

10. An ultrasound system comprising:

an ultrasound transducer having a plurality of transducer elements for transmitting ultrasonic signals on a plurality of transmit beam lines into a patient and for receiving echo signals on a plurality of receive beam lines;

a pulse generator that is selectively coupled to the ultrasound transducer, the pulse generator being programmed to apply driving signals to the transducer elements so that the ultrasonic signals are transmitted on a first set of transmit beam lines and then subsequently transmitted on a second set of transmit beam lines that differ from the first set of transmit beam lines;

a beam former selectively coupled to the ultrasound transducer for combining the received echo signals created in response to the transmissions on the first set of transmit beam lines or the second set of transmit beam lines;

a scan converter that creates pixel data from the combined echo signals created in response to the transmissions on the first set of transmit beam lines or the second set of transmit beam lines; and a monitor to display the pixel data as an ultrasound image.

11. The ultrasound system of claim 10, further comprising:

a memory in which the echo signals created in response to the transmissions on the first and second set of transmit beam lines are stored;

an averaging circuit for averaging the echo signals created in response to the transmissions on the first and second set of transmit beam lines, the averaging circuit having an output that is coupled to the scan converter so that the ultrasound image created represents the average of the received echo signals.

12. The ultrasound system of claim 10, further comprising:

a memory in which the echo signals used by the scan converter to create a previous ultrasound image are stored;

an averaging circuit for averaging new echo signals created in response to transmissions on the first or second set of transmit beam lines with the stored echo signals, the averaging circuit including:

a first multiplier that scales the new echo signals by a factor K;

a second multiplier circuit that scales the stored echo signals by a factor 1–K; and a summing circuit that produces an output equal to the sum of the scaled echo signals, the output of the summing circuit being coupled to the scan converter so that the ultrasound image represents a weighted average of the stored echo signals and the new echo signals.

13. The ultrasound system of claim 12, further comprising a differencing circuit that determines a difference between a new echo signal and a stored echo signal; and a lookup table that stores values of K that are dependent on the difference between the new echo signals and the stored echo signals.

14. A method for creating an ultrasound image in an ultrasound system that transmits and receives ultrasonic signals on a plurality of beam lines, comprising:

alternatingly transmitting ultrasonic signals on a set of even transmit beam lines and a set of odd transmit beam lines;

receiving echo signals created in response to the transmissions on the set of even and odd transmit beam lines;

storing the echo signals received in response to the transmissions on the set of even and odd transmit beam lines;

applying the echo signals created in response to the transmissions on the set of even transmit beam lines and a stored set of echo signals created in response to a previous transmission on the set of odd transmit beam lines to the scan converter to produce the pixel data; or applying the echo signals created in response to the transmission along the set of odd transmit beam lines and a stored set of echo signals created in response to a previous transmission on the set of even transmit beam lines to the scan converter to produce the pixel data; and displaying the pixel data in a monitor to produce the ultrasound image.

15. The method of claim 14, wherein the ultrasound system operates in a parallel beam forming mode whereby the transmission of ultrasonic signals on a single transmit beam line produces echo signals on a pair of receive beam lines;

the method further comprising:

averaging the echo signals created in response to transmissions on the set of even and odd transmit beam lines; and applying the averaged echo signals to the scan converter to produce the pixel data for the ultrasound image.

16. The method of claim 14, wherein the ultrasound system operates in a parallel beam forming mode whereby the transmission of ultrasonic signals along a single transmit beam line produces echo signals on a pair of receive beam lines, the method further comprising:

storing the echo signals that are used by the scan converter to produce a previous ultrasound image;

averaging the echo signals created in response to the transmissions on the set of even or odd transmit beam lines with the stored echo signals used to produce the previous ultrasound image; and applying the averaged echo signals to the scan converter to produce the pixel data for a new ultrasound image.

17. The method of claim 16, wherein the step of averaging the echo signals created in response to the transmissions along the first or second set of transmit beam lines with the stored echo signals comprises:

scaling the echo signals created in response to transmissions on the set of even or odd transmit beam lines by a factor (K);

scaling the stored echo signals by a factor (1–K); and summing the scaled echo signals and applying the sum to the scan converter to produce the pixel data for a new ultrasound image.

18. The method of claim 14, wherein the ultrasound system operates in a parallel beam forming mode whereby the transmission of ultrasonic signals on a single transmit beam line produces echo signals on a pair of receive beam lines, the method further comprising:

averaging the pixel data created by the scan converter in response to echo signals created by transmissions on the set of even and odd transmit beam lines; and displaying the averaged pixel data to create the ultrasound image.

19. The method of claim 14, wherein the ultrasound system operates in a parallel beam forming mode whereby the transmission of ultrasonic signals on a single transmit beam line produces echo signals on a pair of receive beam lines, the method further comprising:

storing the pixel data created by the scan converter to produce a previous ultrasound image;

averaging the pixel data created by the scan converter in response to the transmissions on the set of even or odd transmit beam lines with the stored pixel data used to produce the previous ultrasound image; and displaying the averaged pixel data to produce a new ultrasound image.

20. The method of claim 19, wherein the step of averaging the pixel data created in response to the transmissions on the set of even or odd transmit beam lines with the stored pixel data comprises:

scaling the pixel data created by the scan converter in response to transmissions on the set of even or odd transmit beam lines by a factor (K);

scaling the stored pixel data by a factor (1–K); and summing the scaled pixel data and displaying the summed pixel data to produce a new ultrasound image.

21. A method for creating an ultrasound image in an ultrasound system that operates in a parallel beam forming mode whereby the transmission of ultrasonic signals along a single transmit beam line produces echo signals on a pair of receive beam lines, the method comprising:

alternatingly transmitting ultrasonic signals along a first and second set of transmit beam lines;

receiving echo signals created in response to the transmission along the first and second set of transmit beam lines;

storing the echo signals that are used by a scan converter to produce a previous ultrasound image;

averaging the echo signals created in response to the transmissions along the first or second set of transmit beam lines with the stored echo signals used to produce the previous ultrasound image by:

scaling the echo signals created in response to transmissions along the first or second set of transmit beam lines by a factor (K);

scaling the stored echo signals by a factor (1–K);

summing the scaled echo signals and applying the sum to the scan converter to produce the pixel data for a new ultrasound image;

applying the averaged echo signals to the scan converter to produce the pixel data for a new ultrasound image; and displaying the pixel data on a monitor to produce the ultrasound image.

22. The method of claim 21, wherein the first set of transmit beam lines comprises a set of even transmit beam lines and the second set of beam lines comprises a set of odd transmit beam lines.

23. A method for creating an ultrasound image in an ultrasound system that operates in a parallel beam forming mode whereby the transmission of ultrasonic signals along a single transmit beam line produces echo signals on a pair of receive beam lines, comprising:

alternatingly transmitting ultrasonic signals along a first and second set of transmit beam lines;

receiving echo signals created in response to the transmission along the first and second set of transmit beam lines;

storing the pixel data created by a scan converter to produce a previous ultrasound image;

averaging the pixel data created by the scan converter in response to the transmissions along the first or second set of transmit beam lines with the stored pixel data used to produce the previous ultrasound image by:

scaling the pixel data created by the scan converter in response to transmissions along the first or second set of transmit beam lines by a factor (K);

scaling the stored pixel data by a factor (1–K);

summing the scaled pixel data and displaying the summed pixel data to produce a new ultrasound image; and displaying the averaged pixel data to produce a new ultrasound image.

24. The method of claim 23, wherein the first set of transmit beam lines comprises a set of even transmit beam lines and the second set of beam lines comprises a set of odd transmit beam lines.

25. An ultrasound system comprising:

an ultrasound transducer having a plurality of transducer elements for transmitting ultrasonic signals on a plurality of transmit beam lines into a patient and for receiving echo signals on a plurality of receive beam lines;

a pulse generator that is selectively coupled to the ultrasound transducer, the pulse generator being programmed to applying driving signals to the transducer elements so that the ultrasonic signals are alternately transmitted on a first and second set of transmit beam lines;

a beam former selectively coupled to the ultrasound transducer for combining the received echo signals;

a scan converter coupled to receive the combined echo signals created in response to the transmissions on the first set of transmit beam lines and on the second set of transmit beam lines to produce pixel data;

a memory in which the echo signals used by the scan converter to create a previous ultrasound image are stored;

an averaging circuit for averaging new echo signals created in response to transmissions on the first or second set of transmit beam lines with the stored echo signals, the averaging circuit including:

a first multiplier that scales the new echo signals by a factor K;

a second multiplier circuit that scales the stored echo signals by a factor 1–K;

a summing circuit that produces an output equal to the sum of the scaled echo signals, the output of the summing circuit being coupled to the scan converter so that the ultrasound image represents a weighted average of the stored echo signals and the new echo signals; and a monitor to display the pixel data as an ultrasound image.

26. The ultrasound system of claim 25, further comprising a differencing circuit that determines a difference between a new echo signal and a stored echo signal; and a lookup table that stores values of K that are dependent on the difference between the new echo signals and the stored echo signals.

* * * * *